(12) United States Patent
Koo et al.

(10) Patent No.: US 9,405,697 B2
(45) Date of Patent: Aug. 2, 2016

(54) MEMORY MANAGEMENT METHOD AND APPARATUS

(71) Applicant: Samsung Electronics Co., Ltd., Gyeonggi-do (KR)

(72) Inventors: Jin Kyu Koo, Gyeonggi-do (KR); Sang-Bok Han, Gyeonggi-do (KR); Myung Sun Kim, Gyeonggi-do (KR); In Choon Yeo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 14/307,371

(22) Filed: Jun. 17, 2014

(65) Prior Publication Data

US 2014/0372726 A1 Dec. 18, 2014

(30) Foreign Application Priority Data

Jun. 17, 2013 (KR) ........................ 10-2013-0069214

(51) Int. Cl.
*G06F 12/00* (2006.01)
*G06F 12/10* (2016.01)
*G06F 12/02* (2006.01)

(52) U.S. Cl.
CPC ............ *G06F 12/10* (2013.01); *G06F 12/0253* (2013.01); *G06F 12/0292* (2013.01); *G06F 12/109* (2013.01)

(58) Field of Classification Search
None
See application file for complete search history.

(56) References Cited

U.S. PATENT DOCUMENTS

| 7,017,024 B2 * | 3/2006 | Arimilli | .................. G06F 12/08 711/104 |
| 2005/0055528 A1 * | 3/2005 | Arimilli | ............. G06F 12/0866 711/203 |

* cited by examiner

*Primary Examiner* — Brian Peugh (57) ABSTRACT

A method for managing memory using a virtual memory manager includes receiving a memory allocation request, allocating memory of a physical address space in response to the memory allocation request, mapping an address value of the memory allocated in the physical address space to consecutive primary virtual address space, and mapping the address value of the primary virtual address space to one of a first and second secondary virtual address spaces to process a new memory allocation request in a situation where memory a fragmentation occurs. Other embodiments are also disclosed. The methods and apparatuses of the present disclosure are capable of moving active memory blocks of the fragmented virtual memory space to another virtual memory space to resolve the memory fragmentation even when a memory fragmentation occurs.

20 Claims, 10 Drawing Sheets

MEMORY MANAGEMENT METHOD AND APPARATUS

CROSS-REFERENCE TO RELATED APPLICATION AND CLAIM OF PRIORITY

The present application is related to and claims the benefit under 35 U.S.C. §119(a) of a Korean patent application No. 10-20130069214 filed on Jun. 17, 2013 in the Korean Intellectual Property Office, the entire disclosure of which is hereby incorporated by reference.

TECHNICAL FIELD

The present disclosure relates to a method and apparatus for solving memory fragmentation problem of an electronic device and, in particular, to a method and apparatus for managing virtual memory using a virtual memory manager.

BACKGROUND

With the advance of technologies, recent electronic devices come with various features. For example, a mobile terminal is equipped with various multimedia functions including Television function (e.g. Digital Multimedia Broadcasting (DMB) and Digital Video Broadcasting (DVB)), music player function (e.g. MPEG Audio Layer-3 (MP3)), camera function, Internet access function, dictionary function, etc. in addition to the basic communication function such as voice telephony and messaging functions. With the diversification of multimedia functions, the memory request for executing the functions increases and thus inefficient memory management is likely cause failing program execution.

Particularly, the memory fragmentation causes waste of memory, resulting in failure of utilizing available memory for operation of the program. The memory fragmentation describes a state in which a plurality of memory fragments occur in the process of allocating and withdrawing memory to and from the programs repeatedly without use due to their sizes smaller than that required by the processor.

SUMMARY

To address the above-discussed deficiencies, it is a primary object to provide an enhanced memory management method and apparatus. Also, the present disclosure provides a method for managing the memory using a virtual memory. Also, the present disclosure provides a memory management method using secondary virtualization. Also, the present disclosure provides a memory management method and apparatus capable of mitigating memory fragmentations in such a way of configuring two secondary virtual address spaces and, when one of address spaces is fragmented, moving the active memory blocks to the other address space.

In accordance with an aspect of the present disclosure, a memory management method of an electronic device is provided. The memory management method includes receiving a memory allocation request, allocating memory of a physical address space in response to the memory allocation request, mapping an address value of the memory allocated in the physical address space to consecutive primary virtual address space, and mapping the address value of the primary virtual address space to one of a first and second secondary virtual address spaces to process a new memory allocation request in a situation where a memory fragmentation occurs.

In accordance with another aspect of the present disclosure, an electronic device having a memory is provided. The electronic device includes a memory unit which stores at least one data and a virtual memory management unit receives a memory allocation request, allocating memory of a physical address space in response to the memory allocation request, maps an address value of the memory allocated in the physical address space to consecutive primary virtual address space, and maps the address value of the primary virtual address space to one of a first and second secondary virtual address spaces to process a new memory allocation request in a situation where a memory fragmentation occurs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The foregoing and other goals, features, and advantages of the present disclosure will be made more apparent from the following description with reference to accompanying drawings, and the technical concept of the present disclosure can be practiced by those skilled in the art. Detailed description of well-known functions and structures incorporated herein may be omitted to avoid obscuring the subject matter of the present disclosure. The terminology used herein is for the purpose of describing particular embodiments only and is not intended to be limiting of the disclosure. Unless otherwise defined, all terms used herein have the same meaning as commonly understood by one of ordinary skill in the art to which this disclosure pertains, and should not be interpreted as having an excessively comprehensive meaning or as having an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Exemplary embodiments of the present disclosure are described with reference to the accompanying drawings in detail.

In the following description, the virtual memory or virtual memory device denotes a means to assigns virtual memory addresses other than physical memory addresses to the programs.

An address assigned virtually is referred to as virtual address or logical address, and the address on the physical memory is referred to as physical address or real address.

In the present disclosure, the virtual address range may be referred to as virtual address space, and the physical address range as physical address space. The virtual address space is the address used in view of process, and the virtual address space is given per process.

The memory block may be a unit for use in splitting the address space of Operating System or program arbitrarily. If the memory size is fixed, this is referred to as page and, otherwise, as segment.

In the present disclosure, the memory or memory unit as a device may be referred to as physical memory in the opposite meaning of virtual memory.

Figure 1:
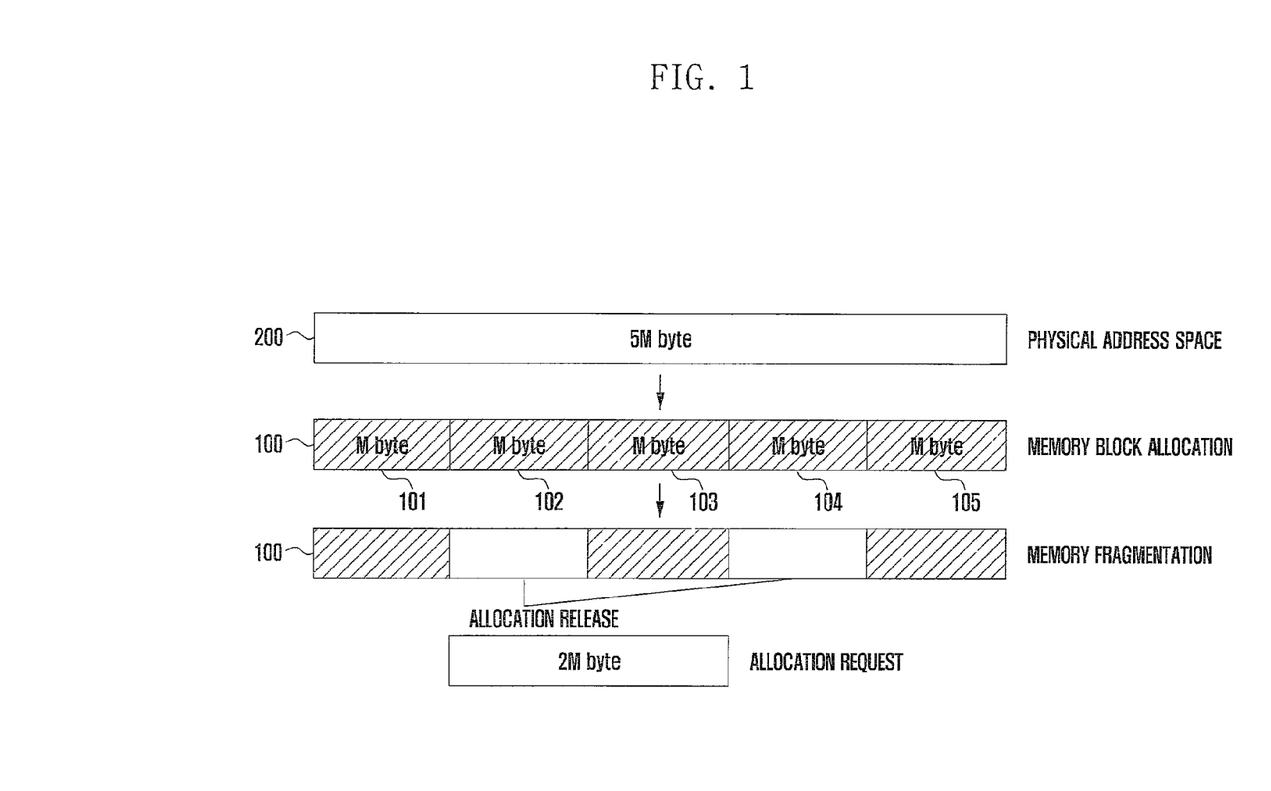
FIG. 1 is a diagram illustrating memory fragmentations.

FIG. 1 is a diagram illustrating memory fragmentations. Referring to FIG. 1, there is available memory of 5M bytes. The 5 Mbyte physical address space 100 can be split into 5 consecutive M-byte memory blocks 101, 102, 103, 104, and 105. In this case, the address space 101 has no available memory. However, if a few memory blocks 102 and 104 are released in this situation, the system can secure 2 Mbyte available memory. However, although a program requests for 2 Mbyte memory allocation in this situation, the system cannot process allocation request successfully. When the system cannot processes the memory allocation request even though the available memory is equal in size to or greater than the allocation requested memory size, this state is referred to as a memory fragmentation. The memory fragmentation is inevitable in the system allocating and releasing memory blocks different in size over the time dynamically. There is therefore a need of a method for solving the memory fragmentation problem.

Figure 2:
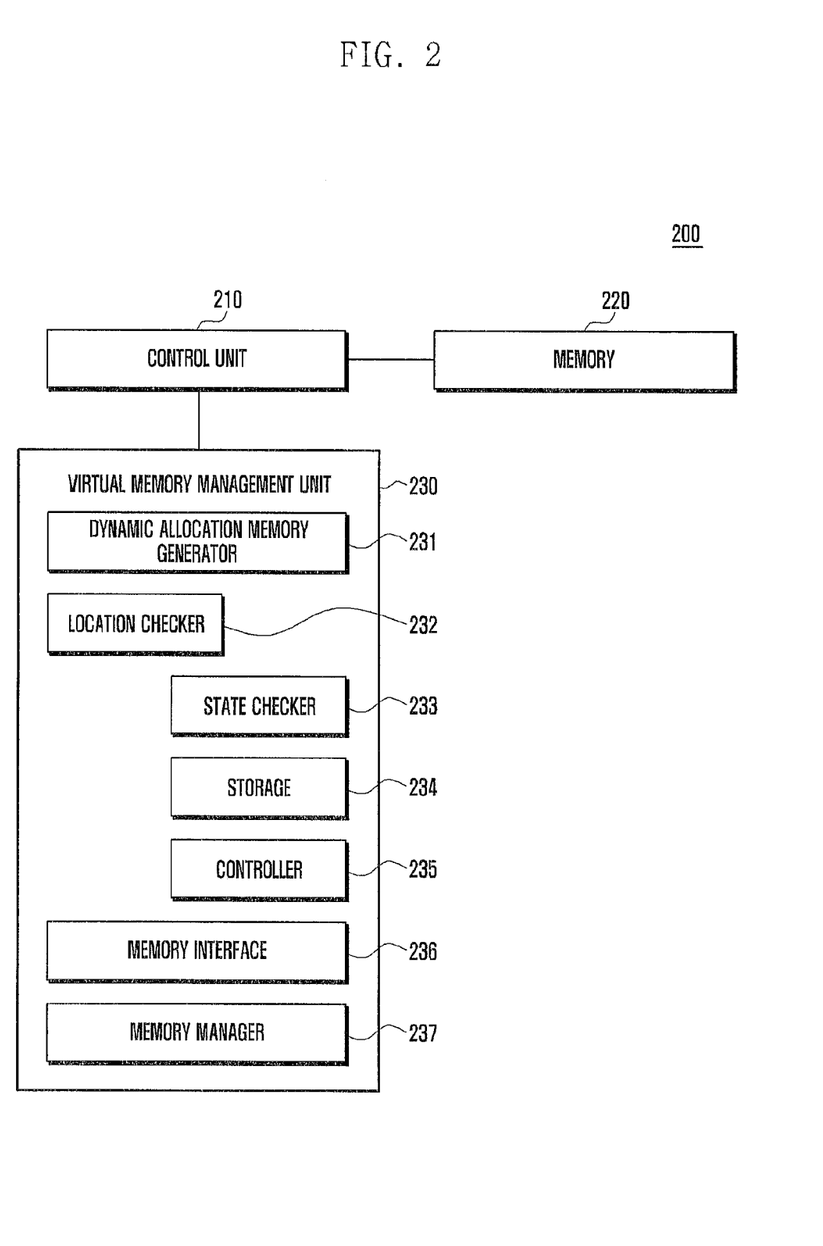
FIG. 2 is a block diagram illustrating a configuration of the electronic device according to an embodiment of the present disclose.

FIG. 2 is a block diagram illustrating a configuration of the electronic device according to an embodiment of the present disclosure.

As shown in FIG. 2, the electronic device 200 according to an embodiment of the present disclosure includes a control unit 210, a memory 220, and a virtual memory management unit 230. Although the virtual memory management unit is depicted a component separated from the control unit 210, the relationship of the virtual memory management unit 230 and the control unit 210 is not limited thereto but the virtual memory management unit 230 can be included in the control unit 210. In an embodiment of the present disclosure, the electronic device 200 can be a communication terminal. In the case that the electronic device 200 is a terminal supporting a mobile communication function, it can further include a radio communication unit. In order to support various functions, the terminal can further include an input unit for generating input signals and an audio processing unit for collecting and processing audio signals.

The above-structured electronic device operates such that the control unit 210 performs a certain function according to a user request or preset scheduling information. Particularly according to an embodiment of the present disclosure, the control unit 210 can control the memory 220. The control unit 210 can control the memory and virtual memory. Controlling the memory can include allocating and/or releasing memory and loading data.

In the following description, the memory 220 can store and load application programs and data required for supporting functions. The application programs can include various processes and applications, and the data can include data necessary for the operation of the programs and generated by the application programs.

The memory 220 is the area on which various programs are loaded in association with the operation of the electronic device 200. In order to store the programs, the electronic device 200 can include a separate storage unit 230. The memory 220 can include a space reserved for storing the programs.

The virtual memory management unit 230 can include a dynamic allocation memory generator 231, a location checker 232, a state checker 233, a storage 234, a controller 235, a memory interface 236, and a memory manager 237.

The virtual memory management unit 230 can control the virtual memory using the reference address on the dynamic allocation memory region and the displacement of the reference address through Application Program Interface (API) defined separately.

The dynamic allocation memory generator 231 generates dynamic allocation memory using a means capable of allocating memory dynamically like malloc( ) function of programming language of C. In the case of generating the dynamic allocation memory region using the reference address and displacement of reference address, the dynamic allocation memory generator 231 output the address of the generated memory region address; and in the case of generating the dynamic allocation memory using a separately defined API, the dynamic allocation memory generator 231 outputs a handle for the generated memory region.

The location checker 232 can be responsible for checking the information on the location of the dynamic allocation memory region allocated dynamically in the memory space. The dynamic location memory region is a part of a hip region and is allocated while the application program is running, and the location checker 20 can check the address of the dynamic allocation memory region. The location checker 232 is activated in compiling the application program to check the location information of the dynamic allocation memory region and can be activated in the runtime of the application program through an API defined separately to check the location information of the dynamic allocation memory region.

Here, the location information of the dynamic allocation memory region which is checked by the location checker 232 can include at least one of reference address of the dynamic allocation memory region, displacement of reference address, and physical memory address and size.

The state checker 233 is responsible for checking memory usage rate, dynamic allocation memory region access right state, dynamic allocation memory region task state, and Central Processing Unit (CPU) usage rate.

The storage 234 can store at least one of dynamic allocation memory region reference address, reference address displacement, and physical memory address and size checked by the location checker 232. Here, the displacement is set to a value less than the size of the dynamic allocation memory region. That is, the dynamic allocation memory region can be referenced in correspondence to the reference address and displacement. The storage unit 234 can be a module capable of inputting and/or outputting information such as hard disk, flash memory, Compact Flash (CF) card, Secure Digital (SD) card, Smart Media (SM) card, Multimedia Card (MMC), and Memory Stick, which is implemented inside or outside the device.

The memory manager 237 performs memory management operation according to the check result of the state checker 233. The memory manager 237 can store the reference address of the dynamic allocation memory region, reference address displacement, and physical memory address and size changed in the process of management into the storage 234.

The memory interface 236 makes it possible to access the dynamic allocation memory region managed by the memory manager 270. The memory interface 236 can make it possible to access the dynamic allocation memory by referencing the reference address and displacement of the reference address analyzed in compiling, the separately defined API included in the memory interface 236 can access the dynamic allocation memory region by referencing the physical memory address and size of the dynamic allocation memory region.

In the above description, the virtual memory management unit 230 has been made up of a plurality of blocks having different functions. However, such a description has been made for convenience and simplicity of explanation, but the present disclosure is not limited thereto. For example, the virtual memory management unit 230 can perform the functions of the memory manager 237.

The virtual memory management unit 230 is described in more detail hereinafter. In the present disclosure, the virtual memory management unit 230 receives a memory allocation request from a processor and maps the address value of the memory to a consecutive primary virtual address space first. In order to process a new memory allocation request in the situation of a memory fragmentation, it can be possible to map the address value of the primary virtual address to one of the first and second secondary virtual address spaces secondly. At this time, the primary virtual address space and the first and second secondary virtual address spaces can be equal in size.

If memory fragmentation occurs, the virtual memory management unit 230 can move the active memory blocks of one of the first and second secondary virtual address spaces, which is used by the processor, to the other secondary virtual address space. The active memory blocks can be moved so as to be located consecutively. By locating consecutively, it is possible to maximize the available memory space.

If the consecutive available memory size in one of the first and second secondary virtual address spaces, which is used by the processor, is less than the memory size requested by the processor, the virtual memory management unit 230 determines this as the memory fragmentation.

The virtual memory management unit 230 can change the mapping relationship of the mapping table to move the active memory block. In this case, the mapping relationship can be changed to move the active memory block in such a way of changing the secondary virtual address corresponding to the active memory block but not changing the physical address and the primary virtual address corresponding to the active memory block to be moved. That is, the active memory block moves through change of the virtual address mapping in the first and second secondary virtual address spaces.

The virtual memory management unit 230 can move the active memory block as follows. The virtual memory management unit 230 can check whether there is any active memory block to move. If there is any active memory block to move, the virtual memory management unit 230 determines a new secondary virtual address for the active memory block. If the secondary virtual address is determined, the virtual memory management unit 230 moves links the new secondary virtual address to the primary virtual address of the corresponding memory block to move the active memory block.

The virtual memory management unit 230 can move the active block in various ways. For example, it is possible to use the least address value of the virtual space to which the active block moves. That is, the virtual memory management unit 230 the least address value of unallocated memory in the secondary virtual address space to which the active memory block moves. Next, the virtual memory management unit 230 can determine the address value of the address space corresponding to the returned address value as the new secondary virtual address value. In the case of using this method, the active memory blocks can be arranged consecutively from position of the least address value. In this case, it is possible to secure the available memory space as large as possible.

The virtual memory management unit 230 can manage a mapping table. In order to process a memory allocation request, the virtual memory management unit 230 can manage the mapping table. If a new memory allocation request is received, the virtual memory management unit 230 can allocate the memory of requested size and determine whether the memory allocation request is an active memory block movement request or a new memory allocation request. If the request is the active memory block movement request, the virtual memory management unit 230 can update the secondary virtual address mapping information in the mapping table. Otherwise, if the request is the new memory allocation request, the virtual memory management unit 230 can add a physical address and first and secondary virtual address mapping information corresponding to the new memory block, to the mapping table.

Figure 3:
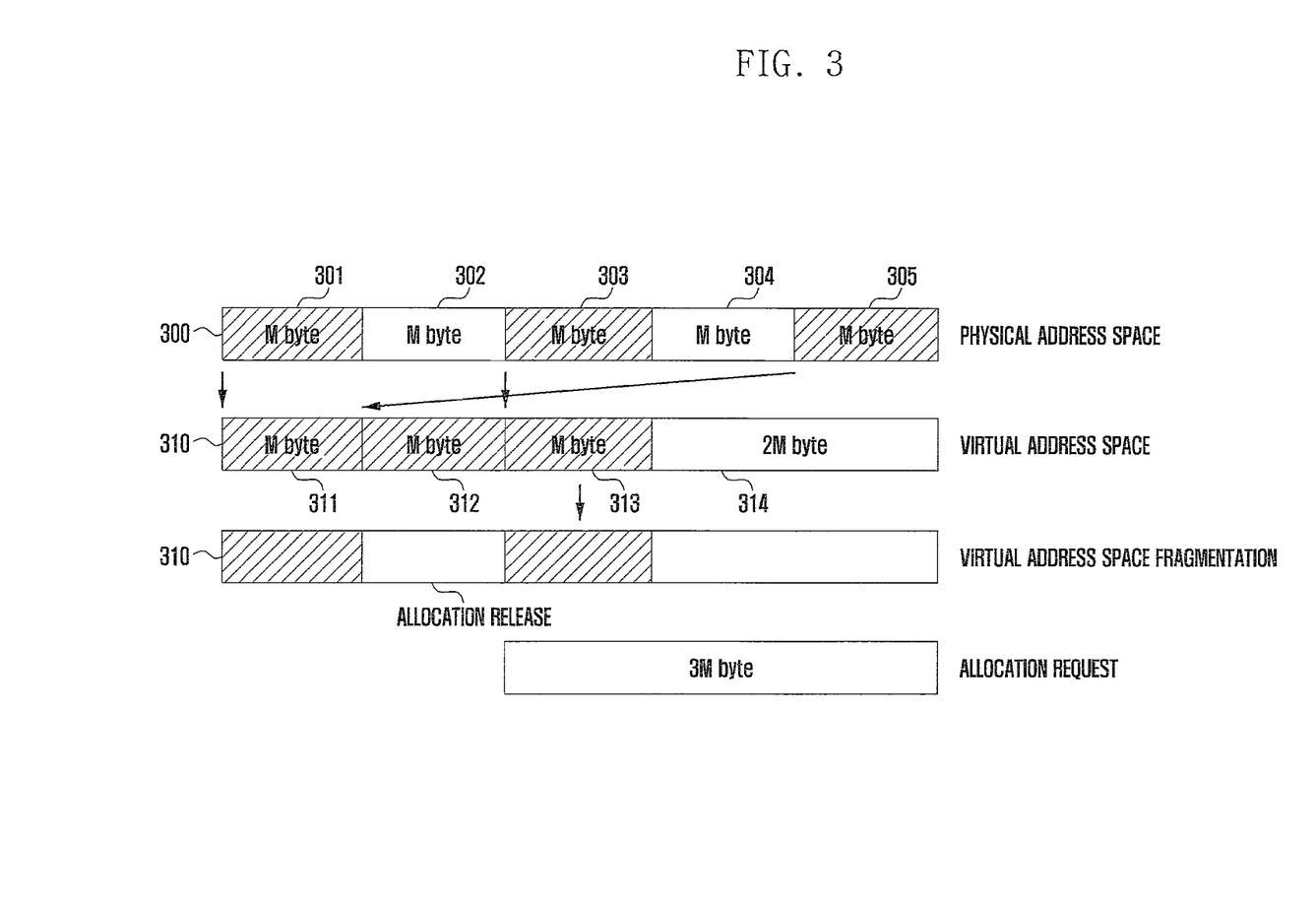
FIG. 3 is a diagram illustrating a memory management scheme using virtual memory according to an embodiment of the present disclosure.

FIG. 3 is a diagram illustrating a memory management scheme using virtual memory according to an embodiment of the present disclosure. The virtual memory allocation method of FIG. 3 maps the physical memory address of the hardware to the virtual memory address space per process which uses the virtual memory address space.

Referring to FIG. 3, the 5-Mbyte physical address space 300 consists of 5 consecutive M-byte blocks 301, 302, 303, 304, and 305. Assuming that the blocks 301, 303, and 305 are allocated (among the 5 consecutive M-byte blocks 301, 302, 303, 304, and 305), the memory blocks 301, 303, and 305 allocated inconsecutively can be shown as if consecutive in the virtual address space 310 by adjusting the mapping the physical address space 300 and the virtual address space 310. In the case of mapping the physical address to the virtual address space, a mapping table can be used. The mapping table can include the information mapping the physical address of the physical address space to the virtual memory of the virtual address space. Using the mapping table, it is possible to acquire the physical address of the real memory from the virtual address.

That is, the blocks 301, 303, and 305 are mapped to the blocks 311, 313, and 315 respectively so as to be shown as arranged consecutively. In this case, although the unallocated memory of 2 Mbytes is fragmented in the physical address space 310, the corresponding 2-Mbyte blocks are consecutive in the virtual address space 310 as denoted by the reference number 314. Accordingly, the memory allocation request for 1 to 2 Mbytes that cannot be processed in the physical address space, can be processed by securing 2-Mbyte consecutive virtual memory space in use of the virtual memory technique.

The embodiment of FIG. 3 is capable of solving the memory fragmentation problem to some extent. However, if the memory fragmentation occurs again in the virtual address space, it can fail to process the virtual memory allocation request. For example, although 3-Mbyte unallocated virtual memory space is secured by releasing the block 312 of the virtual address space 310, the 3-byte unallocated memory space is fragmented into 1-Mbyte block 213 and 2-byte block 314 so as not to fulfil the condition of processing any memory block allocation request for 3 Mbytes successfully.

Figure 4:
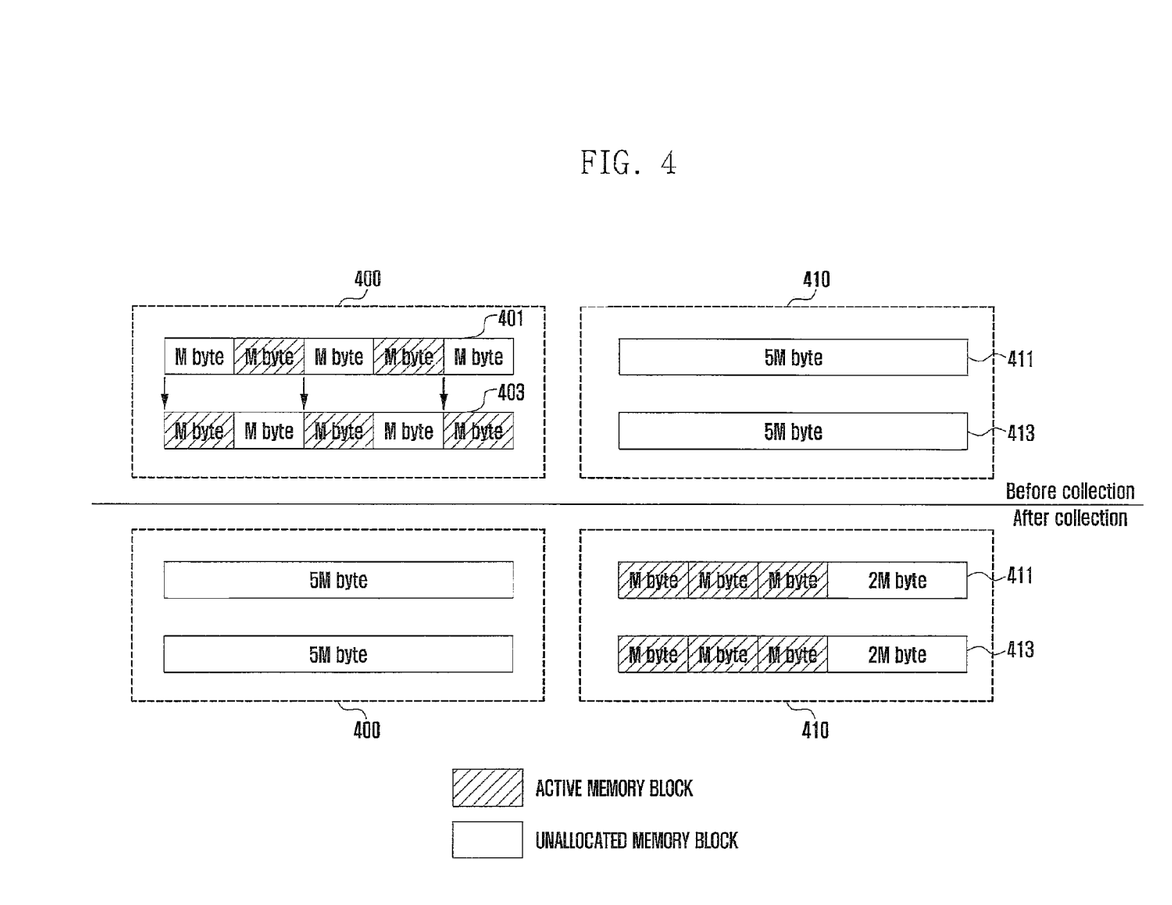
FIG. 4 is a diagram illustrating a concept of managing memory in the virtual address space according to an embodiment of the present disclosure.

FIG. 4 is a diagram illustrating a concept of managing memory in the virtual address space according to an embodiment of the present disclosure.

FIG. 4 is directed to the method of managing the memory with the configuration of the memory address space twice larger than the memory space requested by a process and of the virtual memory space address. The embodiment of FIG. 4 is capable of supplementing the virtual memory management to solve the memory fragmentation in the virtual address space.

According to an embodiment, the virtual memory management unit can configure the memory address space twice larger than the memory space requested by the process. The process uses one half of the configured space at every moment and, if memory fragmentation occurs in this half, moves the active memory blocks in use to the other half. When moving the active memory blocks, the system can position the active memory blocks consecutive through appropriate mapping. This makes it possible to prevent the unallocated memory space of the other half from being fragmented. Once the active memory blocks are moved to the other half, the process uses only this new half memory space. If a memory fragmentation occurs in the current half memory space in use, the system moves the active blocks back to the other half memory space again, and this operation is repeated to avoid memory fragmentation in the virtual address space.

The embodiment of FIG. 4 is described in more detail hereinafter. The system can configure two address spaces, i.e. the first address region 400 and the second address area 410 for one process. The first address area 400 can include the first physical address apace 401 and the first virtual address space 403. The first physical address space 401 can correspond to the first virtual address space 403. The second address region 401 can include the second physical address space 411 and the second virtual address space 413. The second virtual address space 413 can be equal in size to the first virtual address space 403. The second physical address space 411 can correspond to the second virtual address space.

A description is made the operation before the occurrence of collection. The process processes a memory block allocation request using the first virtual address space 403 of the first address region 400 upon start of the process. In this case, the process does not use the second address region 410. In the course of allocating and releasing the memory blocks of different sizes repeatedly in the first address region 400, the active memory blocks can be arranged inconsecutively. In FIG. 4, if the process requests for 2-Mbyte memory amount in state that 2-Mbyte unallocated memory space exists in the first virtual address space 403 at the time before the collection, it is likely to fail to process the request. This is because the unallocated memory blocks are not consecutive in the first virtual address space 403. The system can determine this situation as occurrence of fragmentation in the first address region 400.

If it is determined that a fragmentation has occurred, the system can move the active blocks of the first address region 400 to the second address region 410. This process for the system to check the active blocks of the first address region 400 and move them to the second address region can be called collection. The collection process can be performed in such a way of copying data from the first physical address space 401 to the second physical address space and mapping the memory blocks to the second virtual address space 413 corresponding to the second physical address space 411.

If the collection is done, the process stops using the first address space 400 and starts using the second address space 410. Through the collection process, it is possible to arrange the active blocks consecutively in the second virtual address space 413 of the second address region 410. In this embodiment, 2-Mbyte available memory space is secured in the second virtual address space 413 through the collection process so as to process the 2-Mbyte memory block allocation request successfully. In the case that the process performs allocating and releasing the memory blocks of different sizes repeatedly, a fragmentation can occur again in the second virtual address space 413. In this case, the system can moves the active blocks of the second address region 410 to the first address region 400 through the collection process. As described above, it is possible to solve the fragmentation problem in the virtual address space by repeating transfer of the active blocks from one address region in which fragmentation occurs to the other address region not in use.

Figure 5:
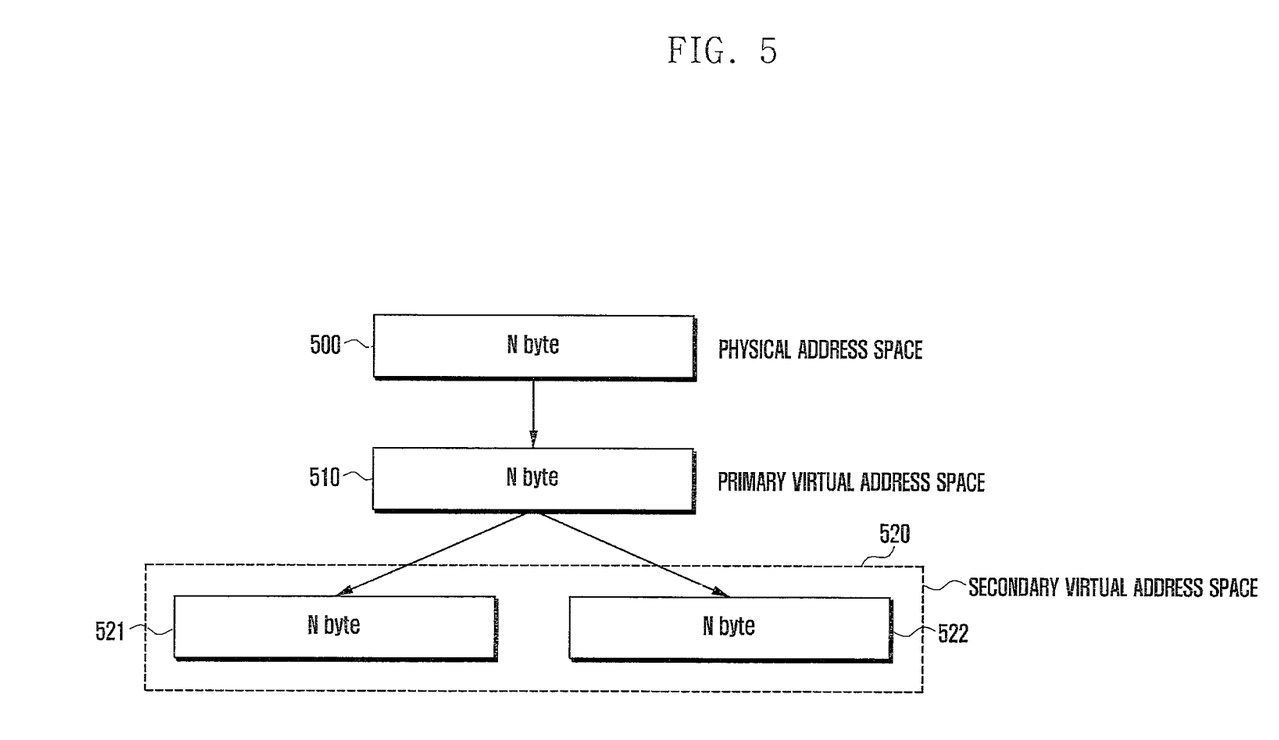
FIG. 5 is a diagram illustrating a concept of memory management method using 2-step virtualization according to an embodiment of the present disclosure.

FIG. 5 is a diagram illustrating a concept of memory management method using 2-step virtualization according to an embodiment of the present disclosure.

The embodiment of FIG. 5 is directed to the method of overcoming the memory fragmentation problem more efficiently. In the embodiment of FIG. 4, the memory size used instantaneously by the process is equal to that of the first address region 400, but the memory space of the second address region 410 has to be reserved always for use by the process. This means that the half of the entire memory space is reserved for the process without memory block allocation, resulting in a resource waste.

It can take a long time to move the data of the first physical address space 401 to the second physical address space 411 due to the direct memory access operation. The embodiment of FIG. 5 is capable of reducing the active block movement time by negating the direct memory access operation as well as by avoiding the unnecessary waste of the physical address space using the 2-step virtualization and the active block movement process.

A description is made of the virtual address space configuration method using the 2-step virtualization with reference to FIG. 5. In this embodiment, if the process requests for N-byte virtual address space, the Operating System (OS) can map the N-byte address value of the physical address space 500 to the N-byte primary virtual address space 510. The primary virtual address space 510 can be consecutive address spaces. The method of mapping the physical address space 500 to the primary virtual address space 510 can be performed as described with reference to FIG. 3.

The address value of the N-byte primary virtual address space 51 can be mapped to the 2N-Byte secondary virtual address space 520. The secondary virtual address space 520 can include two consecutive N-Byte address spaces 521 and 522. An address of the primary virtual address space 510 can be mapped to an address of one of the first and second secondary virtual address spaces 521 and 522 under the control of the virtual memory management unit or the virtual address mapper.

The process requesting for memory can allocate and/or release memory blocks necessary for operation using one of the first and second secondary virtual address spaces 521 and 522. The process can use one of the first and second secondary virtual address spaces 521 and 522 at a given time. This means that the only one of the first and second secondary address spaces 521 and 522 is used. That is, the process can switch between the first and second secondary virtual address spaces 521 as time progresses. The process uses one of the first and second secondary virtual address spaces selectively, but do not use the both simultaneously.

If a fragmentation occurs in one (which is in use) of the two secondary virtual address spaces 521 and 522, the active memory blocks of the virtual address space in use is moved to the other virtual address space through consecutive mapping such that the fragmentation is resolved. In the active memory block movement process according to an embodiment of the present disclosure, the address of the secondary virtual address space 520 can be changed but the addresses of the physical address space 500 and the primary virtual address space 510 are not changed.

Figure 6:
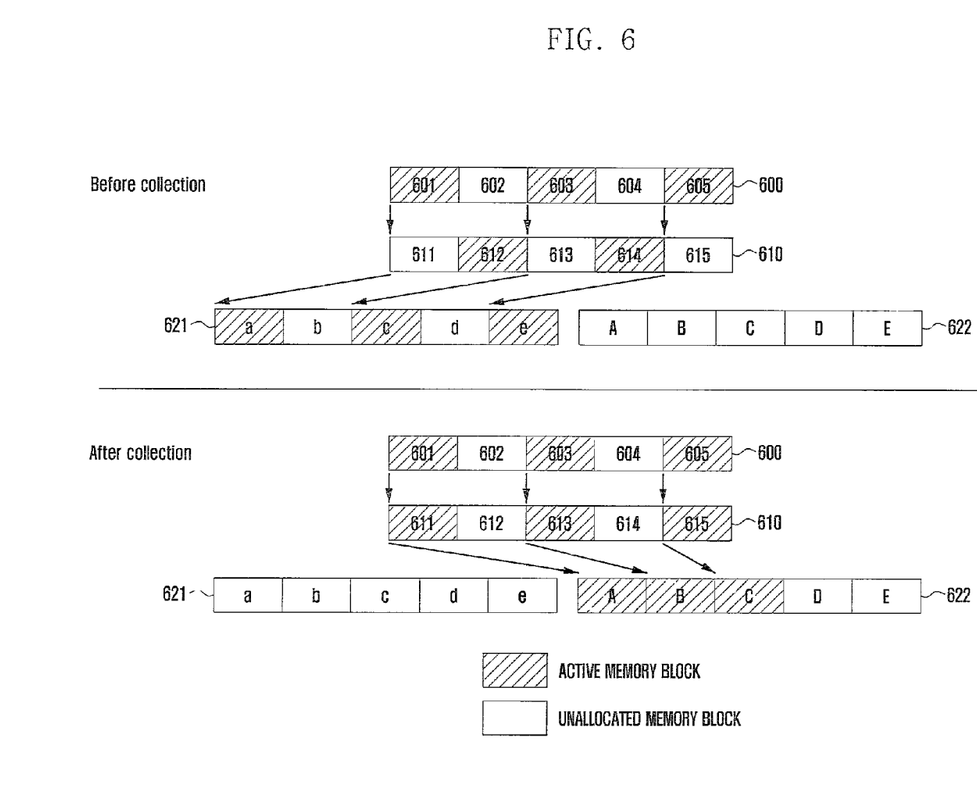
FIG. 6 is a diagram illustrating a concept of the active block mapping method of FIG. 5.
Figure 7:
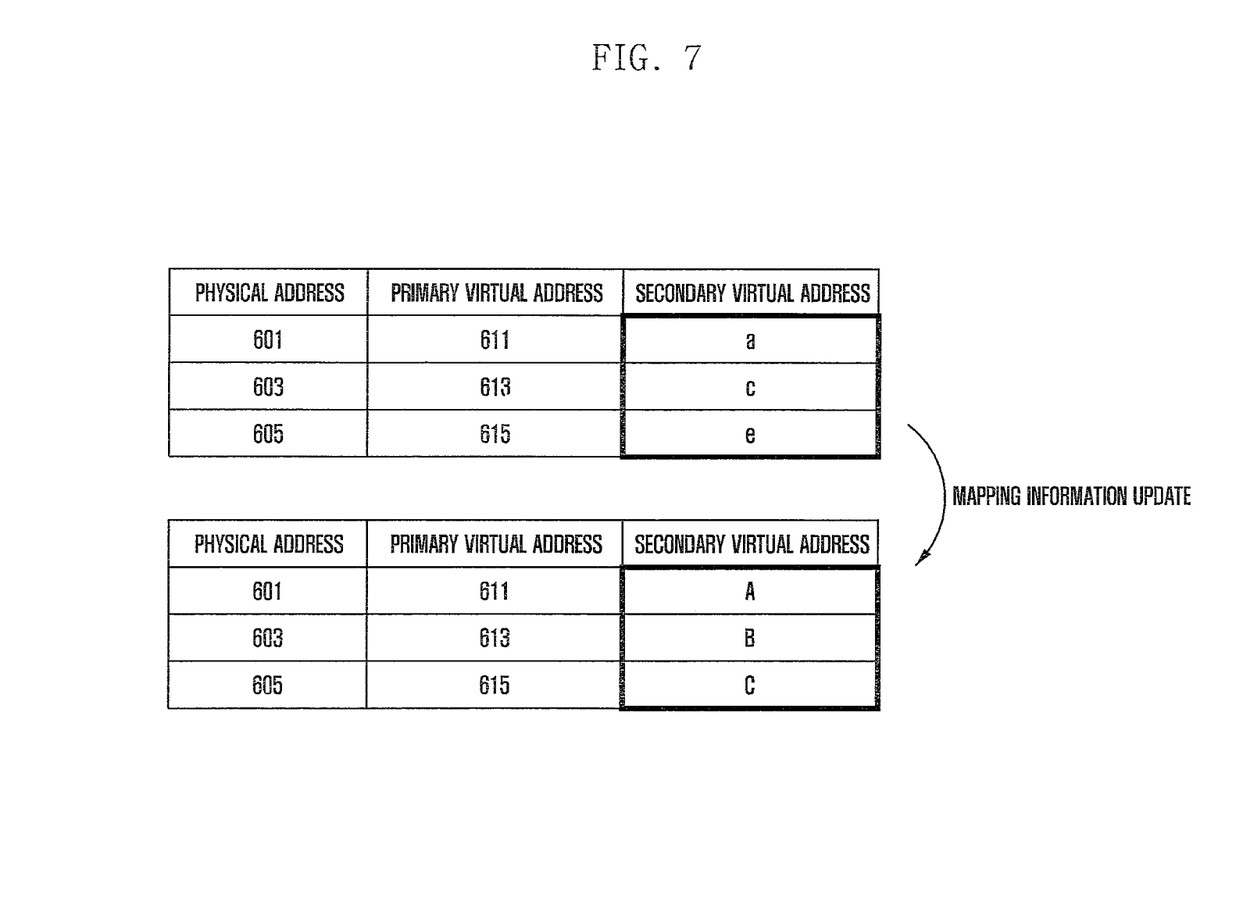
FIG. 7 is a diagram illustrating a mapping table for use in the embodiment of FIG. 6.

A description is made of the method of mapping active memory in the 2-step virtualized space with reference to FIGS. 6 and 7. FIG. 6 is a diagram illustrating a concept of the active block mapping method of FIG. 5, and FIG. 7 is a diagram illustrating a mapping table for use in the embodiment of FIG. 6.

In the case that the process needs N-byte virtual address space, the OS can map the N-byte physical address space 600 to the N-byte primary virtual address space 610. The address value of the N-byte primary virtual address space 610 can be mapped to the 2N-byte secondary virtual address space 620 again. The secondary virtual address space 620 can include two consecutive N-byte address spaces 621 and 622.

The mapping relationship among the physical address space 600 and the primary and second virtual address spaces 610 and 620 is arranged in the mapping table of FIG. 7. The mapping table maps the virtual addresses and the physical addresses. In order for the process to access a specific memory, the OS has to convert the virtual address of the process to the memory address of the system. Accordingly, the mapping table is configured per process.

Referring to the mapping table of FIG. 7, the physical address 601 of FIG. 6 is mapped to the primary virtual address 611, the physical address 603 to the primary virtual address 613, and the physical address 605 to the primary virtual address 615. The primary virtual address of the primary virtual address space 610 is mapped to the secondary virtual address a, the primary virtual address 613 to the secondary virtual address 611, and the primary virtual address 615 to the secondary virtual address e. In this case, the second secondary virtual address space 622 is not used in address-mapping of the primary virtual address space 610.

The process can allocate and/or release memory block necessary for operation using the first secondary virtual address space 621. The process can detect the fragmentation of the address space in use of the secondary virtual address space. In this case, the process can switch the roles of the first and second virtual address spaces 621 and 622. That is, if it is determined that the first secondary virtual address space 621 is fragmented in use, the process performs collection process to move the active blocks of the first secondary virtual address space 621 to the second secondary virtual address space 622. At this time, the active memory blocks can be transferred so as to be arranged consecutively in the second secondary virtual address space 622. If the collection process is performed to switch the roles of the first and second secondary virtual address spaces, the secondary virtual addresses are changed without change of the memory addresses of the active memory blocks and the primary virtual addresses.

Referring to the mapping table of FIG. 7, the physical addresses 601, 603, and 605 and the primary virtual addresses 611, 613, and 615 are not changed, but the secondary virtual address corresponding to the primary virtual address 611 can change to 'A', the secondary virtual address corresponding to the primary virtual address 613 to 'B', and the secondary virtual address corresponding to the primary virtual address 615 to 'C'. The memory blocks 'A', 'B', and 'C' can be arranged consecutively in the second secondary virtual address space through the collection process. Although it can be impossible to process the memory allocation request of the process in the first secondary virtual address space 621 due to the fragmentation, the memory blocks can be arranged consecutively through the collection process so as to resolve the fragmentation and process the memory allocation request of the process. In the case that the fragmentation occurs in the secondary virtual address space, the active blocks are moved to the other secondary virtual address space in a consecutive mapping manner so as to resolve the fragmentation problem in the virtual address space.

In the embodiment of FIGS. 5 and 6, any data movement requiring relatively a long time does not occur in the physical address space because there is no change in physical address space. The process can access the memory block of the physical address space using the new secondary virtual address of the memory blocks.

Figure 8:
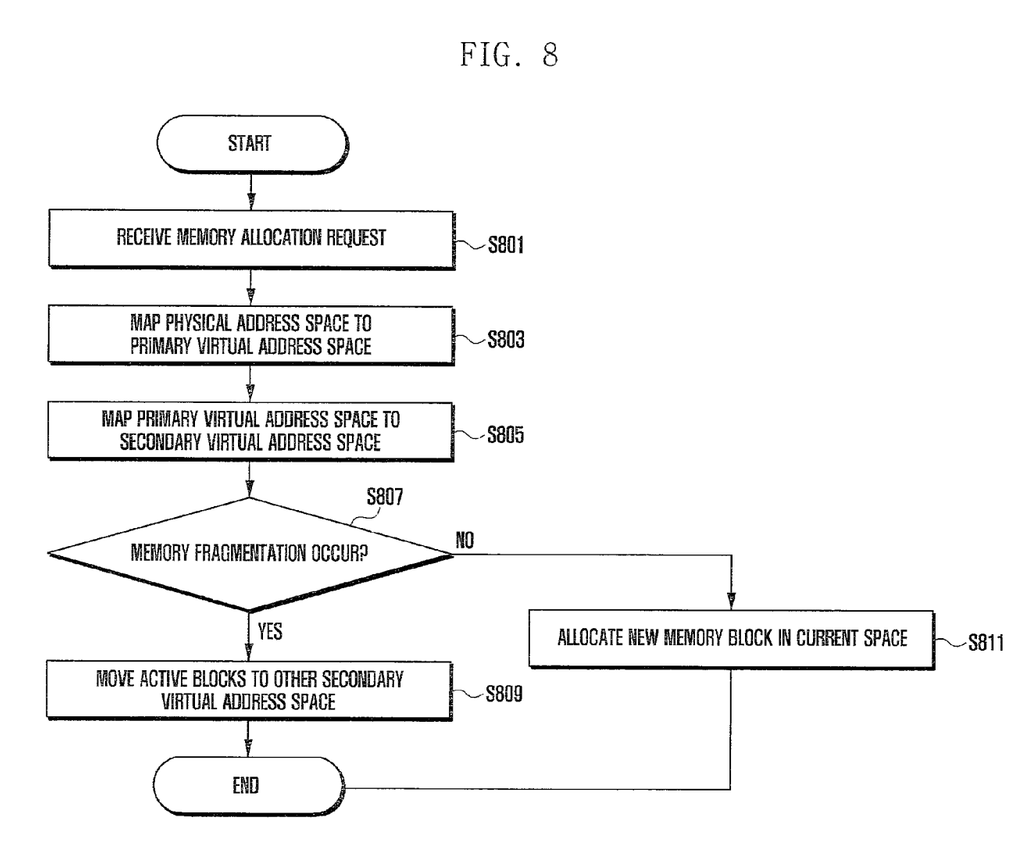
FIG. 8 is a flowchart illustrating the memory management method based on the concept depicted in FIG. 5.

FIG. 8 is a flowchart illustrating the memory management method based on the concept depicted in FIG. 5.

The electronic device using the virtual memory technique receives a memory allocation request from a process at operation 5801. The memory allocation request can be of C language. In an embodiment, malloc( ) function can be used for memory allocation request. The function can vary dependent on the memory module, e.g. malloc( ) and farmalloc( ) functions for memory allocation, realloc( ) function for memory reallocation, and free( ) or farfree( ) function for memory release. If N-byte virtual memory allocation request is received from the process, the virtual memory management unit can map the address value of the N-byte physical address space to the N-byte primary virtual address space at operation 5803. In this case, the primary virtual address space can be consecutive N-byte virtual address space.

The virtual memory management unit can map the address value of the N-byte primary virtual address space to the 2N-byte secondary virtual address space again to resolve the memory fragmentation at operation 5805. The secondary virtual address space can consist of two consecutive N-byte address spaces. The address value of the primary virtual address space can be mapped to one of the first and second secondary virtual address spaces. The memory space to which the primary virtual address space is mapped is determined by the virtual memory management unit. However, the process can use only one of the first and second secondary virtual address spaces both not use both the two secondary virtual address spaces.

The process of allocating/releasing memory blocks necessary for operation using one the first or second secondary virtual address space can determine whether the secondary virtual address space in use is fragmented at operation S807. If the size of the unallocated consecutive memory blocks in one of the first and second secondary virtual address spaces is less than the size of the memory block requested by the process, it is impossible to process the memory allocation successfully an thus the process determines that the memory is fragmented.

If the process determines that the memory is fragmented, the virtual memory management unit can move the active blocks of the secondary virtual address space to other secondary virtual address space at operation S809. In more detail, the virtual memory management unit can move the active memory blocks used by the process currently in one of the first and second secondary virtual address spaces to the other secondary virtual address space not in use. In the case of moving the active memory blocks, the active memory blocks can be rearranged consecutively to secure the memory space available as large as possible for the purpose of resolving a fragmentation.

If a memory allocation request is received in the state of no memory fragmentation, it is possible to allocate memory in the secondary virtual address space in use currently at operation S811.

That is, in this embodiment, the process uses one of the first and second secondary virtual address spaces at a time and thus, if fragmentation occurs in the memory space in use currently, it is possible to move the active blocks to the other memory space, resulting in resolution of memory fragmentation. At this time, only the virtual address of the secondary virtual address space to which the active blocks move without change of the physical address and the first virtual address of the memory blocks. Since only the mapping relationship between the primary and secondary virtual addresses is changed due to the change of the secondary virtual address without change of the physical and the primary virtual address, it is possible to manage the memory through simplified operation.

Figure 9:
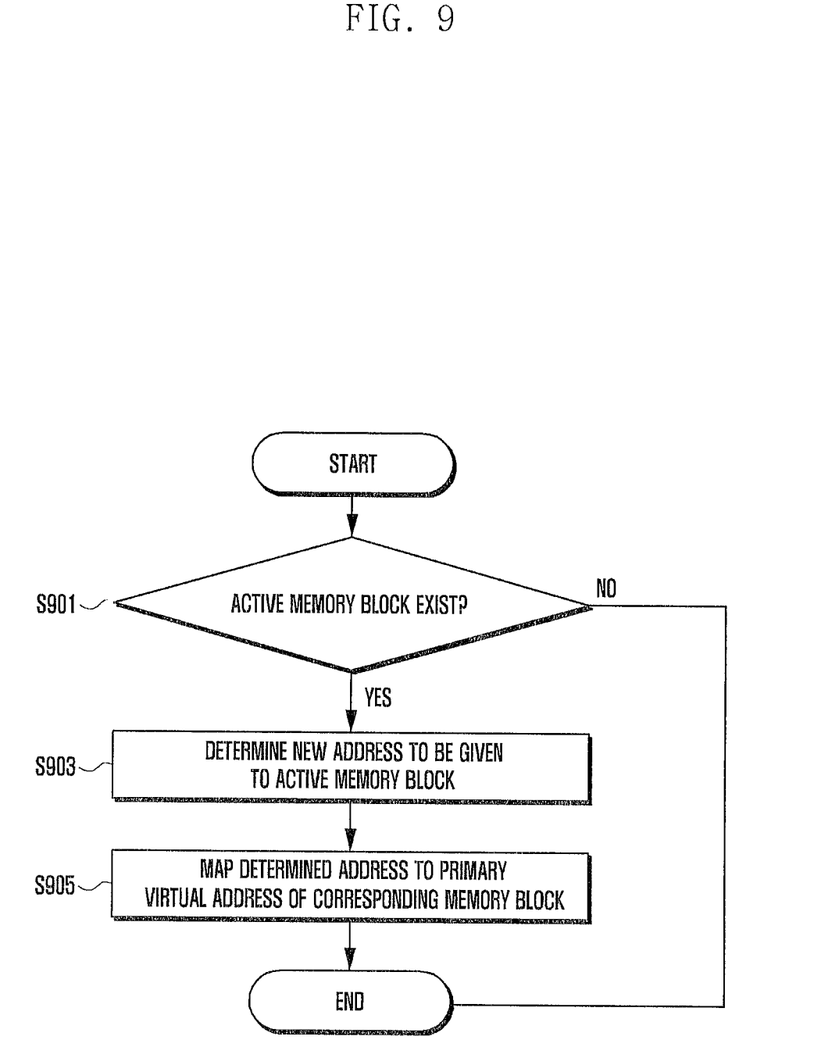
FIG. 9 is a flowchart illustrating a procedure of moving active blocks in the memory management method of FIG. 8.

FIG. 9 is a flowchart illustrating a procedure of moving active blocks in the memory management method of FIG. 8.

If it is determined that the secondary virtual address space in use by the process is fragmented, the virtual memory management unit can move the active memory blocks of the secondary virtual address space in use currently to the other secondary virtual address space not in use.

The virtual memory management unit can determine whether any active memory block exists in the secondary virtual address space in use by the process currently at operation S901, If the first secondary virtual address space is in use but the second secondary virtual address space is not in use, the virtual memory management unit determines that the active memory block exists in the first secondary virtual address space.

Next, the virtual memory management unit can determine a new address of the second secondary virtual address space for the active memory blocks to lie in the second secondary virtual address space at operation S903. The active memory block address determination can be performed in such a way of returning the least address value of the space unallocated in the secondary virtual address space to which the active memory blocks move and determining the address value of the virtual address space corresponding to the returned address value as new secondary virtual address value. However, the active memory block address determination is not limited to the above described embodiment.

If the secondary virtual address is determined, the virtual memory management unit maps the primary virtual address of the corresponding block to the new address at operation S905.

Figure 10:
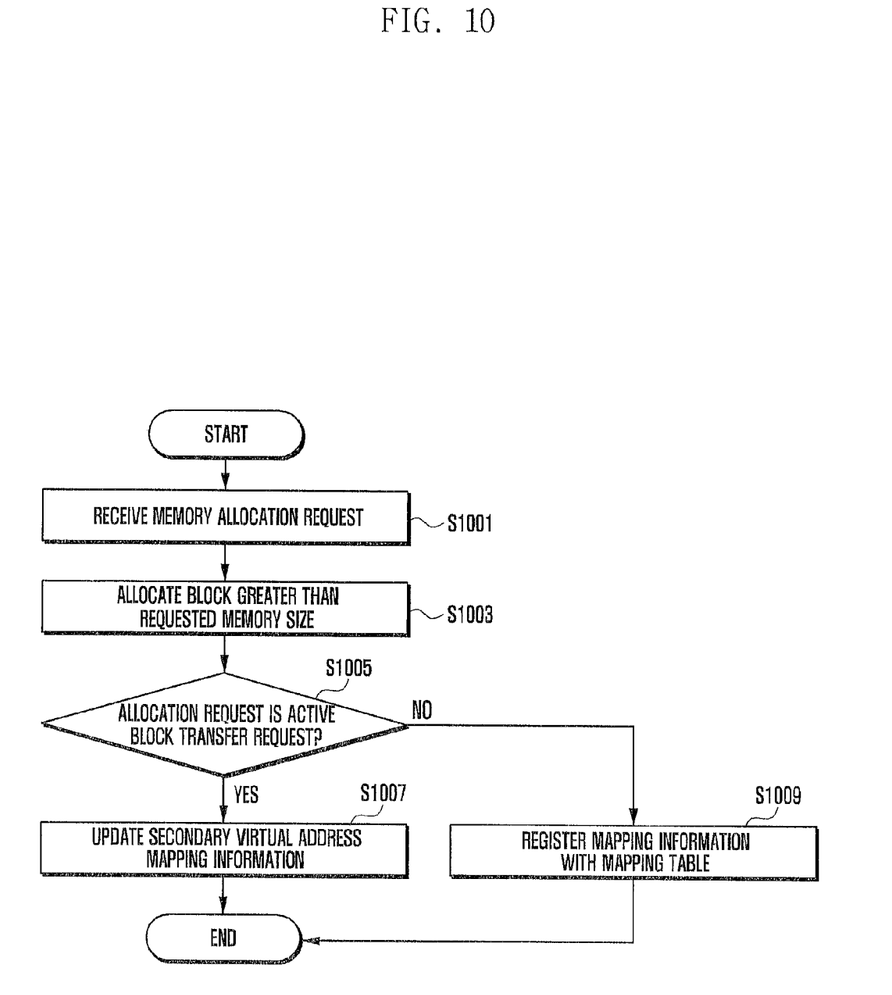
FIG. 10 is a flowchart illustrating the memory management method when new memory allocation request is received in the memory management concept of FIG. 5.

FIG. 10 is a flowchart illustrating the memory management method when new memory allocation request is received in the memory management concept of FIG. 5.

The process can request for memory allocation newly in use of the secondary virtual address space. The virtual memory management unit can receive a memory allocation request from the process at operation S1001. Upon receipt of the memory allocation request, the virtual memory management unit can allocate the block having the least address value among the unallocated memory blocks having the size greater than the requested memory size to the process at operation S1003. The virtual memory management unit can determine whether the memory allocation request from the process is a request for moving the active blocks of the secondary virtual address space in use to the other secondary virtual address space not in use or the request for new memory allocation at operation S1005.

If the request is of moving the active blocks, the virtual memory management unit can update the secondary virtual address mapping information in the mapping table at operation S1007. FIG. 7 can be directed to an embodiment of updating the secondary virtual address mapping information in the mapping table. FIG. 7 shows the change in the mapping table when the active blocks of the first secondary virtual address space move to the second secondary virtual address space. Referring to FIG. 7, when the mapping information is updated, the secondary virtual addresses are changed without change of the physical address and the primary virtual addresses.

If the request is of new memory allocation, the virtual memory management unit can register the physical address and the primary and secondary virtual addresses corresponding to the new memory block with the mapping table at operation S1009. That is, when a new memory allocation request is received, there is not physical and primary virtual address corresponding to the memory block requested for allocation, it is necessary to add mapping information among the physical address and the primary and secondary virtual addresses corresponding to the new memory block to the mapping table.

As described above, the memory management method and apparatus of the present disclosure is capable of allowing the memory blocks to lie consecutively in the virtual address space. In this way, the virtual address spaces switch their roles whenever memory fragmentation occurs so as to solve the memory fragmentation problem.

Also, the memory management method and apparatus of the present disclosure is advantageous in terms of solving a memory fragmentation by moving the active memory block through simple operation of changing secondary virtual address mapping on in the virtual address space.

Also, the memory management method and apparatus of the present disclosure is advantageous in terms of using the memory efficiently by avoiding unnecessary waste of physical address space.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A memory management method of an electronic device, the method comprising:
   receiving a memory allocation request for data;
   allocating physical address space of a memory space to the data in response to the memory allocation request;
   mapping address values of the memory allocated in the physical address space to a consecutive primary virtual address space; and
   mapping the address values of the primary virtual address space to one of a first and second secondary virtual address spaces to process a next memory allocation request in a situation where a memory fragmentation occurs.

2. The method of claim 1, wherein the physical address space, the primary virtual address space, the first secondary virtual space, and the second secondary virtual space are identical in size.

3. The method of claim 1, further comprising:
   moving, when the memory fragmentation occurs, active memory blocks of the one of the first and second secondary virtual address spaces, the one which is in use, to the other secondary virtual address space not in use currently.

4. The method of claim 3, further comprising:
   determining, when a consecutive memory size unallocated in the virtual address space used by a process is less than a memory size requested by the process, that the memory is fragmented.

5. The method of claim 3, wherein moving the active memory blocks comprises:
   changing the secondary virtual address without change of physical address and first virtual address corresponding to the active memory blocks.

6. The method of claim 3, wherein moving the active memory blocks comprises:
   checking whether an active memory block exists;
   determining, when the active memory block exists, a new secondary virtual address necessary for moving the checks active memory block; and
   mapping, when the new address is determined, the new virtual address to the primary virtual address of the corresponding memory block.

7. The method of claim 6, wherein determining the new secondary virtual address comprises:
   returning a least address value of memory unallocated in the secondary virtual address space to which the active memory block is moved; and
   determining the address value of the address space corresponding to the returned address value as a new secondary virtual address value.

8. The method of claim 3, further comprising:
   allocating, when the next memory allocation request is received, a memory with a size requested in the next memory allocation request; and
   determining whether the memory allocation request is an active memory block transfer request or the next memory allocation request.

9. The method of claim 8, further comprising:
   updating, when the memory allocation request is the active memory block transfer request, the secondary virtual address mapping information in the mapping table.

10. The method of claim 8, further comprising:
    adding, when the memory allocation request is the next memory allocation request, the mapping information on the physical address and the first and second virtual addresses corresponding to the new memory block, to the mapping table.

11. An electronic device having a memory, the electronic device comprising:
    a memory unit configured to store at least one data; and
    a controller configured to:
      receive a memory allocation request for the data;
      allocate a physical address space of a memory to the data in response to the memory allocation request;
      map address values of the memory allocated in the physical address space to a consecutive primary virtual address space; and
      map the address values of the primary virtual address space to one of a first and second secondary virtual address spaces to process a next memory allocation request in a situation where a memory fragmentation occurs.

12. The electronic device of claim 11, wherein the primary virtual address space, the first secondary virtual space, and the second secondary virtual space are identical in size.

13. The electronic device of claim 12, wherein the controller is configured to:
    return a least address value of memory unallocated in the secondary virtual address space to which the active memory block is moved, and
    determine the address value of the address space corresponding to the returned address value as a new secondary virtual address value.

14. The electronic device of claim 11, wherein the controller is configured to move, when the memory fragmentation occurs, active memory blocks of the one of the first and second secondary virtual address spaces, the one which is in use, to the other secondary virtual address space not in use currently.

15. The electronic device of claim 14, wherein the controller is configured to determine, when a consecutive memory size unallocated in the virtual address space used by a process is less than a memory size requested, that the memory is fragmented.

16. The electronic device of claim 14, wherein the controller is configured to change the secondary virtual address without a change of physical addresses and first virtual address corresponding to the active memory blocks.

17. The electronic device of claim 14, wherein the controller is configured to
    check whether an active memory block exists,
    determine, when any active memory block exists, a new secondary virtual address necessary for moving the active memory block, and
    maps, when the new address is determined, the new virtual address to the primary virtual address of the corresponding memory block.

18. The electronic device of claim 14, wherein the controller is configured to:

allocate, when a next memory allocation request is received, a memory with the size requested in receiving the new memory allocation request, and determine whether the memory allocation request is an active memory block transfer request or new memory allocation request.

19. The electronic device of claim 14, wherein the controller is configured to update, when the memory allocation request is the active memory block transfer request, the secondary virtual address mapping information in the mapping table.

20. The electronic device of claim 14, wherein the controller is configured to add, when the memory allocation request is the new memory allocation request, the mapping information on the physical address and the first and second virtual addresses corresponding to the new memory block to the mapping table.

* * * * *